(12) United States Patent
Wang et al.

(10) Patent No.: US 11,107,239 B2
(45) Date of Patent: Aug. 31, 2021

(54) POSE DETECTION METHOD AND DEVICE, ELECTRONIC DEVICE AND STORAGE MEDIUM

(71) Applicant: BEIJING SENSETIME TECHNOLOGY DEVELOPMENT CO., LTD., Beijing (CN)

(72) Inventors: Min Wang, Beijing (CN); Wentao Liu, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/049,674

(22) PCT Filed: Jun. 28, 2019

(86) PCT No.: PCT/CN2019/093697
§ 371 (c)(1),
(2) Date: Oct. 22, 2020

(87) PCT Pub. No.: WO2020/038111
PCT Pub. Date: Feb. 27, 2020

(65) Prior Publication Data
US 2021/0090288 A1    Mar. 25, 2021

(30) Foreign Application Priority Data

Aug. 20, 2018 (CN) .......................... 201810949860.8
Aug. 20, 2018 (CN) .......................... 201810950565.4

(51) Int. Cl.
*G06K 9/00* (2006.01)
*G06T 7/73* (2017.01)
(Continued)

(52) U.S. Cl.
CPC .................. *G06T 7/73* (2017.01); *G06T 3/20* (2013.01); *G06T 3/60* (2013.01)

(58) Field of Classification Search
CPC ........ G06K 9/48; G06K 9/4604; G06K 9/643; G06K 9/52; G06T 7/0022; G06T 7/0075;
(Continued)

(56) References Cited

U.S. PATENT DOCUMENTS 7,848,548 B1 * 12/2010 Moon ...................... G06K 9/68
382/118
8,717,418 B1 * 5/2014 Prince .................. H04N 13/133
348/46

(Continued)

FOREIGN PATENT DOCUMENTS

| CN | 101339607 A | 1/2009 |
| CN | 101441769 A | 5/2009 |

(Continued)

OTHER PUBLICATIONS

Yu et al., "Three-dimensional working pose estimation in industrial scenarios with monocular camera", IEEE 2020, pp. 1-10.*

(Continued)

*Primary Examiner* — Amir Alavi
(74) *Attorney, Agent, or Firm* — Cooper Legal Group, LLC

(57) ABSTRACT

An orientation detection method and device, electronic device and storage medium, the method comprising: determining first position information of at least one first feature part of a target object in a target image (S100); determining three-dimensional position information of a second feature part of the target object on the basis of the first position information and device parameters of a camera device (S200); and determining spatial orientation of the target object on the basis of the first position information of the at (Continued)

least one first feature part comprised in the second feature part and the three-dimensional position information of the second feature part (S300). The described method may increase the accuracy of orientation detection.

20 Claims, 5 Drawing Sheets

(51) Int. Cl.
*G06T 3/20* (2006.01)
*G06T 3/60* (2006.01)

(58) Field of Classification Search
CPC ... G06T 2207/10012; G06T 7/73; G06T 3/20; H04N 7/26643; H04N 13/0239; H04N 13/0082
See application file for complete search history.

(56) References Cited

U.S. PATENT DOCUMENTS

| | | | |
|---|---|---|---|
| 8,805,057 B2* | 8/2014 | Taguchi | G06T 7/586 |
| | | | 382/154 |
| 9,415,310 B2* | 8/2016 | Martini | A63F 13/5378 |
| 9,740,924 B1* | 8/2017 | Gopalan | G06K 9/4642 |
| 9,798,388 B1* | 10/2017 | Murali | G06F 3/016 |
| 9,818,195 B2* | 11/2017 | Zach | G06K 9/52 |
| 10,082,866 B2* | 9/2018 | Ahuja | G06F 3/013 |
| 10,109,072 B2* | 10/2018 | Stehle | G06K 9/6205 |
| 10,600,203 B2* | 3/2020 | Glover | G06T 7/73 |
| 10,866,423 B2* | 12/2020 | Kaufmann | G02B 27/0172 |
| 2008/0130961 A1 | 6/2008 | Kinoshita | |
| 2012/0163723 A1 | 6/2012 | Balan | |
| 2016/0132755 A1 | 5/2016 | Ikeda | |
| 2019/0239850 A1* | 8/2019 | Dalvin | A61B 8/462 |

FOREIGN PATENT DOCUMENTS

| | | |
|---|---|---|
| CN | 101839692 A | 9/2010 |
| CN | 101876532 A | 11/2010 |
| CN | 103777754 A | 5/2014 |
| CN | 105235451 A | 1/2016 |
| CN | 106346485 A | 1/2017 |
| CN | 107491751 A | 12/2017 |
| CN | 108177143 A | 6/2018 |
| CN | 108230397 A | 6/2018 |
| CN | 109241875 A | 1/2019 |
| CN | 109284681 A | 1/2019 |
| EP | 3293705 A1 | 3/2018 |
| JP | 2000251078 A | 9/2000 |
| JP | 2015090560 A | 5/2015 |
| JP | 2018055589 A | 4/2018 |
| JP | 2018067115 A | 4/2018 |
| KR | 20180087947 A | 8/2018 |

OTHER PUBLICATIONS

First Office Action and the English Translation of the Chinese application No. 201810949860.8, dated Jan. 19, 2020, 22 pages.
International Search Report and the English Translation in the international application No. PCT/CN2019/093697, dated Sep. 27, 2019, 7 pages.
Written Opinion and the English Translation of the International Search Authority in the international application No. PCT/CN2019/093697, dated Sep. 27, 2019, 12 pages.
Dada MFZ, Distortion correction and anti-distortion calculation for camera calibration, https://www.cnblogs.com/mafuqiang/p/8134617.html, Dec. 28, 2017 (Dec. 28, 2017), 5 pages.
First Office Action and the English Translation of the Chinese application No. 201810950565.4, dated Jan. 16, 2020, 26 pages.
Second Office Action and the English Translation of the Chinese application No. 201810950565.4, dated Apr. 16, 2020, 24 pages.
Third Office Action and the English Translation of the Chinese application No. 201810950565.4, dated Jul. 9, 2020, 8 pages.
Second Office Action and the English Translation of the Chinese application No. 201810949860.8, dated Apr. 13, 2020, 15 pages.
Notice of Allowance and the English Translation of the Chinese application No. 201810949860.8, dated Jul. 24, 2020, 3 pages.
"A Simple Yet Effective Baseline for 3d Human Pose Estimation", Oct. 2017, Julieta Martinez, Rayat Hossain, Javier Romero and James J. Little, 2017 IEEE International Conference on Computer Vision, (ICCV), IEEE, pp. 2659-2668.
Supplementary European Search Report in the European application No. 19853007.3, dated Apr. 30, 2021, 8 pgs.
First Office Action of the Korean application No. 10-2020-7030384, dated Jun. 28, 2021.

* cited by examiner

POSE DETECTION METHOD AND DEVICE, ELECTRONIC DEVICE AND STORAGE MEDIUM

CROSS-REFERENCE TO RELATED APPLICATION

This application claims priority to Chinese patent application No. 201810950565.4 filed on Aug. 20, 2018 and Chinese patent application No. 201810949860.8 filed on Aug. 20, 2018, the disclosures of which are hereby incorporated by reference in their entirety.

TECHNICAL FIELD

The disclosure relates to the technical field of image processing, and particularly relates to a method and device for pose and position detection, an electronic device and a storage medium.

BACKGROUND

In computer vision, human pose estimation is an important human-computer interaction interface. Especially, pose and position estimation on the human body in a three-dimensional space is the most basic and key content in an interaction process.

In traditional technologies, a relatively expensive depth camera device is used to perform relatively rough three-dimensional modeling on the human body, so as to achieve the purpose of predicting the pose of the human body relative to the camera.

SUMMARY

The embodiments of the disclosure provide a technical solution for pose detection.

According to a first aspect of the disclosure, a method for pose and position detection is provided. The method for pose and position detection includes: first position information of at least one first feature part of a target object within a target image is determined, wherein the target image is taken by a camera device; three-dimensional position information of second feature parts of the target object is determined based on the first position information and device parameters of the camera device, wherein the second feature parts at least include the at least one first feature part; and the spatial position and pose of the target object is determined based on the first position information of the at least one first feature part included in the second feature parts and the three-dimensional position information of the second feature parts.

In the embodiment of the disclosure, the step that the first position information of the at least one first feature part of the target object in the target image is determined includes: the information of a first feature part to be identified is acquired; the at least one first feature part in the target object is identified based on the acquired information of the first feature part; and the first position information of the at least one first feature part is determined based on an established two-dimensional coordinate system.

In the embodiment of the disclosure, the step that the three-dimensional position information of the second feature parts of the target object is determined based on the first position information and the device parameters of the camera device includes: normalization processing is performed on the first position information based on the device parameters of the camera device to obtain second position information; and the three-dimensional position information of the second feature parts is determined by using the second position information.

In the embodiment of the disclosure, the step that normalization processing is performed on the first position information based on the device parameters of the camera device to obtain the second position information includes: first normalization processing is performed on the first position information by using the device parameters to obtain third position information of the at least one first feature part; a mean and a variance of the third position information of the at least one first feature part are determined; and second normalization processing is performed on the third position information based on the mean and the variance to obtain the second position information.

In the embodiment of the disclosure, the step that first normalization processing is performed on the first position information by using the device parameters to obtain the third position information of the at least one first feature part includes: distortion removing processing is performed on the first position information by using the device parameters; and first normalization processing is performed on the first position information obtained by the distortion removing processing to obtain the third position information of the at least one first feature part.

In the embodiment of the disclosure, the step that distortion removing processing is performed on the first position information by using the device parameters includes: the distortion removing processing is performed on the first position information by means of a first formula, wherein the first formula includes:

in the first formula, $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $k_1$, $k_2$, $k_3$, $k_4$, $k_5$, $k_6$ respectively represent radial distortion parameters of the camera device, $p_1$, $p_2$ respectively represent tangential distortion parameters of the camera device, x and y respectively represent a horizontal coordinate value and a vertical coordinate value of the first position information, and u and v respectively represent a horizontal coordinate value and a vertical coordinate value after the distortion processing.

$$x' = (x - c_x)/f_x \quad \text{Formula 1}$$
$$y' = (y - c_y)/f_y;$$
$$r = x'^2 + y'^2$$
$$t = \frac{1 + ((k_6 r^2 + k_5) r^2 + k_4) r^2}{1 + ((k_3 r^2 + k_2) r^2 + k_1) r^2}$$
$$\Delta x = 2 p_1 x' y' + p_2 (r^2 + 2x'^2)$$
$$\Delta y = p_1 (r^2 + 2y'^2) + 2 p_2 x' y'$$
$$u' = (x' - \Delta x)t$$
$$v' = (y' - \Delta y)t$$
$$u = u' f_x + c_x$$
$$v = v' f_x + c_y$$

In the embodiment of the disclosure, the step that second normalization processing is performed on each piece of the third position information based on the mean and the variance to obtain the second position information includes: second normalization processing is performed on the third position information based on the mean and the variance by means of a second formula, wherein the second formula includes:

$$s = \frac{x_i - \text{mean}(x_i)}{\text{std}(x_i)}$$

$$t = \frac{y_i - \text{mean}(y_i)}{\text{std}(y_i)}$$

Formula 2 wherein s and t respectively represent a horizontal coordinate and a vertical coordinate of the second position information, $x_i$ and $y_i$ respectively represent a horizontal coordinate value and a vertical coordinate value of the third position information of the ith first feature, a mean function represents a mean function, an std function represents a variance function, and i is a positive integer.

In the embodiment of the disclosure, the step that the three-dimensional position information of the second feature parts is determined by means of each piece of the second position information includes: the three-dimensional position information of the second feature parts of the target object is acquired according to the second position information of the first feature part by means of a preset model, wherein the preset model includes a deep learning model.

In the embodiment of the disclosure, the step that the three-dimensional position information of the second feature parts of the target object is determined based on the first position information and the device parameters of the camera device includes: normalization processing is performed on the first position information based on the device parameters of the camera device to obtain second position information; fourth position information, which is in a three-dimensional form, of the second feature parts is determined by using the second position information; and inverse normalization processing is performed on the fourth position information to obtain the three-dimensional position information of the second feature parts.

In the embodiment of the disclosure, the step that inverse normalization processing is performed on the fourth position information to acquire the three-dimensional position information of each of the second feature parts includes: inverse normalization processing is performed on the fourth position information by means of a third formula to acquire the three-dimensional position information, wherein the third formula includes:

$X' = X*\text{std}(X) + \text{mean}(X)$ $Y' = Y*\text{std}(Y) + \text{mean}(Y)$ $Z' = Z*\text{std}(Z) + \text{mean}(Z)$  Formula 3

Wherein X', Y' and Z' respectively represent three coordinate values of the three-dimensional position information, X, Y and Z respectively represent three coordinate values of the fourth position information, std represents a variance function, and mean represents a mean function.

In the embodiment of the disclosure, the step that the spatial position and pose of the target object is determined based on the first position information of the at least one first feature part included in the second feature parts and the three-dimensional position information of the second feature parts includes: correction parameters are determined based on the first position information of the first feature part included in the second feature parts and the corresponding three-dimensional position information of the included first feature part in the second feature part; the three-dimensional position information is corrected based on the correction parameters; and the spatial position and pose of the target object is determined based on the corrected three-dimensional position information.

In the embodiment of the disclosure, the step that the correction parameters are determined based on the first position information of the first feature part included in the second feature parts and the corresponding three-dimensional position information of the included first feature part in the second feature part includes: the three-dimensional position information of the first feature part in the second feature parts is converted into fifth position information in a two-dimensional form by using a rotation matrix and a translation matrix; feedback-based adjustment is performed on the rotation matrix and the translation matrix based on a difference between the fifth position information and the second position information until the difference meets a preset requirement, wherein the second position information is obtained based on a normalization processing of the first position information; and the correction parameters are determined based on the rotation matrix and the translation matrix when the difference meets the preset requirement.

In the embodiment of the disclosure, the step that the three-dimensional position information of the first feature part in the second feature parts is converted into the fifth position information in a two-dimensional form by means of the rotation matrix and the translation matrix includes: the three-dimensional position information of the first feature part in the second feature parts is converted into the fifth position information in a two-dimensional form by means of the rotation matrix and the translation matrix according to a fourth formula, wherein the fourth formula includes:

$$S_5 = K[R \mid T] \square S_3$$  Formula 4

$$K = \begin{pmatrix} f_x & 0 & c_x \\ 0 & f_y & c_y \\ 0 & 0 & 1 \end{pmatrix}$$

wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, S5 represents the fifth position information, and $S_3$ represents the three-dimensional position information.

In the embodiment of the disclosure, the step that the feedback-based adjustment is performed on the rotation matrix and the translation matrix based on a difference between the fifth position information and the second position information until the difference meets the preset requirement includes: feedback adjustment on the rotation matrix and the translation matrix is performed by means of an optimization model, wherein the expression of the optimization model includes:

$$\underset{R,T}{\arg\min} K[R][T] \square S_3 - S_2$$  Formula 6 wherein an arg min function represents a difference minimization function, and S2 represents the second position information.

In the embodiment of the disclosure, the step that the three-dimensional position information is corrected based on the correction parameters includes: the three-dimensional position information is corrected by means of a fifth formula, wherein the fifth formula includes:

$$P'=P*R+T \qquad \text{Formula 5}$$

wherein P represents the three-dimensional position information before correction, P' represents the corrected three-dimensional position information, R represents the rotation matrix, and T represents the translation matrix.

In the embodiment of the disclosure, the method further includes: a target image is acquired; and a target object in the target image is identified.

In the embodiment of the disclosure, the first feature part includes at least one of a head, a neck, shoulders, elbows, wrists, hips, knees and ankles.

According to a second aspect of the embodiment of the disclosure, a device for pose and position detection is provided. The device for pose and position detection includes: a first determining module configured to determine first position information of at least one first feature part of a target object within a target image, wherein the target image is taken by a camera device; a second determining module configured to determine three-dimensional position information of second feature parts of the target object based on the first position information and device parameters of the camera device, wherein the second feature parts at least include the at least one first feature part; and a third determining module configured to determine the spatial position and pose of the target object based on the first position information of the at least one first feature part included in the second feature parts and the three-dimensional position information of the second feature parts.

In the embodiment of the disclosure, the first determining module includes: an information acquisition unit configured to acquire the information of the first feature part to be identified; a feature identification unit configured to identify the at least one first feature part in the target object based on the acquired information of the first feature part; and a two-dimensional position determining unit configured to determine the first position information of the at least one first feature part based on an established two-dimensional coordinate system.

In the embodiment of the disclosure, the second determining module includes: a normalization unit configured to perform normalization processing on the first position information based on the device parameters of the camera device to obtain second position information; and a three-dimensional position determining unit configured to determine the three-dimensional position information of the second feature parts by using the second position information.

In the embodiment of the disclosure, the normalization unit is further configured to perform first normalization processing on the first position information by using the device parameters to obtain third position information of the at least one first feature part, determine a mean and a variance of the third position information of the at least one first feature part, and perform second normalization processing on the third position information based on the mean and the variance to obtain the second position information.

In the embodiment of the disclosure, the normalization unit is further configured to perform distortion removing processing on the first position information by using the device parameters, and perform first normalization processing on the first position information obtained by the distortion removing processing to obtain the third position information of the at least one first feature part.

In the embodiment of the disclosure, the normalization unit is further configured to perform the distortion removing processing on the first position information by means of a first formula, wherein the first formula includes:

$$x' = (x - c_x)/f_x \qquad \text{Formula 1}$$
$$y' = (y - c_y)/f_y;$$
$$r = x'^2 + y'^2$$
$$t = \frac{1 + ((k_6 r^2 + k_5)r^2 + k_4)r^2}{1 + ((k_3 r^2 + k_2)r^2 + k_1)r^2}$$
$$\Delta x = 2p_1 x' y' + p_2(r^2 + 2x'^2)$$
$$\Delta y = p_1(r^2 + 2y'^2) + 2p_2 x' y'$$
$$u' = (x' - \Delta x)t$$
$$v' = (y' - \Delta y)t$$
$$u = u' f_x + c_x$$
$$v = v' f_x + c_y$$

wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $k_1$, $k_2$, $k_3$, $k_4$, $k_5$, $k_6$ respectively represent radial distortion parameters of the camera device, $p_1$, $p_2$ respectively represent tangential distortion parameters of the camera device, x and y respectively represent a horizontal coordinate value and a vertical coordinate value of the first position information, and u and v respectively represent a horizontal coordinate value and a vertical coordinate value after the distortion processing.

In the embodiment of the disclosure, the normalization unit is further configured to perform second normalization processing on the third position information based on the mean and the variance by means of a second formula, wherein the second formula includes:

$$s = \frac{x_i - \text{mean}(x_i)}{\text{std}(x_i)} \qquad \text{Formula 2}$$
$$t = \frac{y_i - \text{mean}(y_i)}{\text{std}(y_i)}$$

wherein s and t respectively represent a horizontal coordinate and a vertical coordinate of the second position information, $x_i$ and $y_i$ respectively represent a horizontal coordinate value and a vertical coordinate value of the third position information of the ith first feature, a mean function represents a mean function, an std function represents a variance function, and i is a positive integer.

In the embodiment of the disclosure, the three-dimensional position determining unit is further configured to acquire the three-dimensional position information of the second feature parts of the target object according to the second position information of the first feature part by means of a preset model, wherein the preset model includes a deep learning model.

In the embodiment of the disclosure, the second determining module includes: a normalization unit configured to perform normalization processing on the first position information based on the device parameters of the camera device to obtain second position information; a three-dimensional position determining unit configured to determine fourth position information, which is in a three-dimensional form, of the second feature parts by using the second position information; and an inverse normalization unit configured to perform inverse normalization processing on the fourth position information to obtain the three-dimensional position information of the second feature parts.

In the embodiment of the disclosure, the inverse normalization unit is further configured to perform inverse normalization processing on each piece of the fourth position information by means of a third formula to acquire the three-dimensional position information, wherein the third formula includes:

$X'=X*std(X)+\text{mean}(X)$ $Y'=Y*std(Y)+\text{mean}(Y)$ $Z'=Z*std(Z)+\text{mean}(Z)$   Formula 3 wherein X', Y' and Z' respectively represent three coordinate values of the three-dimensional position information, X, Y and Z respectively represent three coordinate values of the fourth position information, std represents a variance function, and mean represents a mean function.

In the embodiment of the disclosure, the third determining module includes: a correction parameter determining unit configured to determine correction parameters based on the first position information of the first feature part included in the second feature parts and the corresponding three-dimensional position information of the included first feature part in the second feature part; a correction unit configured to correct the three-dimensional position information based on the correction parameters; and a position and pose determining unit configured to determine the spatial position and pose of the target object based on the corrected three-dimensional position information.

In the embodiment of the disclosure, the correction parameter determining unit is further configured to convert the three-dimensional position information of the first feature part in the second feature parts into fifth position information in a two-dimensional form by using a rotation matrix and a translation matrix; perform feedback-based adjustation on the rotation matrix and the translation matrix based on a difference between the fifth position information and the second position information until the difference meets the preset requirement, wherein the second position information is obtained based on a normalization processing of the first position information; and determine the correction parameters based on the rotation matrix and the translation matrix when the difference meets the preset requirement.

In the embodiment of the disclosure, the correction parameter determining unit is further configured to convert the three-dimensional position information of the first feature part in the second feature parts into the fifth position information in a two-dimensional form by means of the rotation matrix and the translation matrix according to a fourth formula, wherein the fourth formula includes:

$S_5 = K[R|T] \square S_3$   Formula 4

$$K = \begin{pmatrix} f_x & 0 & c_x \\ 0 & f_y & c_y \\ 0 & 0 & 1 \end{pmatrix}$$

wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $S_5$ represents the fifth position information, and $S_3$ represents the three-dimensional position information.

In the embodiment of the disclosure, the correction parameter determining unit is further configured to perform feedback adjustment on the rotation matrix and the translation matrix by means of an optimization model, wherein the expression of the optimization model includes:

$$\underset{R,T}{\text{argmin}} K[R][T]\square S_3 - S_2$$   Formula 6 wherein an arg min function represents a difference minimization function, and S2 represents the second position information.

In the embodiment of the disclosure, the correction unit is further configured to correct the three-dimensional position information by means of a fifth formula, wherein the fifth formula includes:

$P'=P*R+T$   Formula 5 wherein P represents the three-dimensional position information before correction, P' represents the corrected three-dimensional position information, R represents the rotation matrix, and T represents the translation matrix.

In the embodiment of the disclosure, the device may further include: an image acquisition module configured to acquire a target image; and an object identification module configured to identify a target object in the target image.

In the embodiment of the disclosure, the first feature part includes at least one of a head, a neck, shoulders, elbows, wrists, hips, knees and ankles.

According to a third aspect of the embodiment of the disclosure, an electronic device is provided. The electronic device includes: a processor, and a memory configured to store executable instructions of the processor, wherein the processor is configured to perform the method of any one of claims in the first aspect.

According to a fourth aspect of the embodiment of the disclosure, a computer-readable storage medium in which a computer program instruction is stored is provided. When the computer program instruction is performed by the processor, the method of any one of claims in the first aspect is implemented.

According to a fifth aspect of the disclosure, a computer program including computer-readable codes is provided. When the computer-readable codes run in the electronic device, the processor in the electronic device performs the method of any one of claims in the first aspect.

In the embodiment of the disclosure, the pose detection of an object in an image may be performed by combining device parameters, the influence of different device parameters on the pose detection may be eliminated, and the accuracy of the pose detection may be improved. At the same time, in the embodiment of the disclosure, the adjustment on the correction parameters of the three-dimensional position information may be determined by means of the difference between the first position information and the three-dimensional position information, so as to further improve the accuracy of the pose detection.

It should be understood that the above general description and the following detailed description are merely exemplary and explanatory, but do not limit the disclosure.

Other features and aspects of the disclosure will become clear from the following detailed description of exemplary embodiments with reference to the accompanying drawings.

BRIEF DESCRIPTION OF THE DRAWINGS

The accompanying drawings, which are incorporated in and constitute a part of this specification, illustrate embodiments consistent with the disclosure and, together with the description, serve to explain the technical solutions of the disclosure.

DETAILED DESCRIPTION

Figure 1:
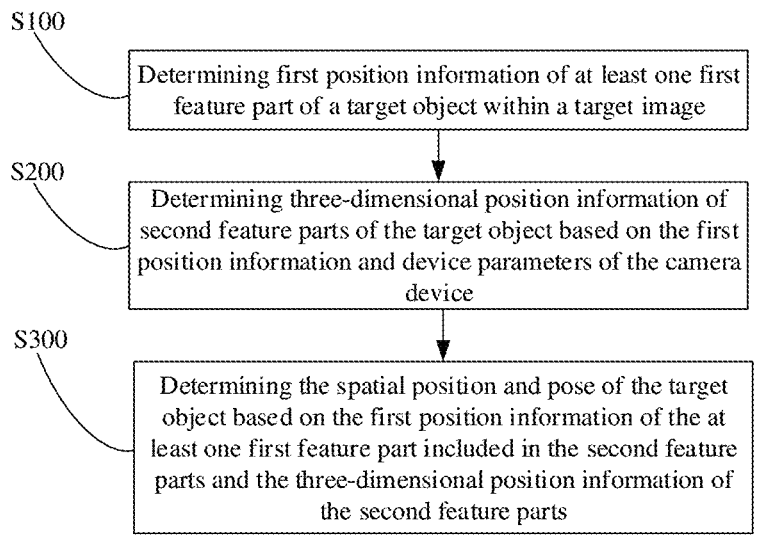
FIG. 1 shows a flow diagram of a method for pose and position detection according to an embodiment of the disclosure.

Various exemplary embodiments, features and aspects of the disclosure will be described in detail below with reference to the drawings. The same reference numerals in the drawings represent components having the same or similar functions. Although various aspects of the embodiments are shown in the drawings, unless otherwise specified, the drawings are not necessarily drawn to scale.

The specific word "exemplary" here means "used as an example, embodiment, or illustrative". Any embodiment described here as "exemplary" needs not be interpreted as superior or better than other embodiments.

In the disclosure, the term "and/or" only describes the relationships of associated objects, indicating that there may be three relationships. For example, A and/or B may indicate that there are three conditions: A exists alone, A and B exist simultaneously, and B exists alone. In addition, the term "at least one" herein means any one of a plurality or any combination of at least two of a plurality. For example, including at least one of A, B and C may mean including any one or more of elements selected from a set consisting of A, B and C.

In addition, in order to better illustrate the disclosure, numerous specific details are given in specific implementation manners below. Those skilled in the art should understand that the disclosure may also be implemented without certain specific details. In some examples, methods, means, components and circuits well known to those skilled in the art are not described in detail in order to highlight the gist of the disclosure.

It can be understood that the above method embodiments mentioned in the disclosure may be combined with each other to form a combined embodiment without violating the principle logic, but due to space limitations, the disclosure will not repeat the details.

In addition, the disclosure further provides an image processing device, an electronic device, a computer-readable storage medium and a program, all of which can be configured to implement any one of image processing methods provided by the disclosure. The corresponding technical solutions and descriptions and the corresponding records in reference methods are not repeated here.

FIG. 1 shows a flow diagram of a method for pose and position detection according to an embodiment of the disclosure. As shown in FIG. 1, the method for pose and position detection may include:

S100: first position information of at least one first feature part of a target object within a target image is determined, wherein the target image is taken by a camera device;

S200: three-dimensional position information of second feature parts of the target object is determined based on the first position information and device parameters of the camera device, wherein the second feature part includes the at least one first feature part; and S300: the spatial position and pose of the target object is determined based on the first position information of the at least one first feature part included in the second feature parts and the three-dimensional position information of the second feature parts.

The method for pose and position detection provided by the embodiment of the disclosure may be configured to perform pose detection of a human object in an image, and poses may include the position information and spatial pose of each of the feature parts of the human object. Poses may include running, sitting, standing, walking, jumping, creeping, lying down, flying, etc., or other states. All the situations that can be used as the spatial state of the target object can be used as the pose types identified by the embodiment of the disclosure. In addition, the embodiment of the disclosure may perform the position optimization of each of the feature parts of the human object in combination with the parameters of the camera device that takes the image, and each piece of position information is further optimized by means of the determined correction parameters, so as to improve the accuracy of pose detection.

The target object in the present embodiment refers to an image for performing pose detection. An object for which pose detection is performed is called the target object, and the target object may include people, animals, and the like. In the embodiment of the disclosure, a target image may be acquired first. For example, the target image may be selected from the stored image data, or the transmitted target image may be received from other devices, or the target image may be directly taken through the camera device. The above is only an exemplary description of acquiring the target image, which is not limited by the disclosure.

After the target image is acquired, the target object in the target image may be identified. The target object in the target image may be identified by an image identification algorithm, or the target object may be identified by a trained machine learning network model. The machine learning network model may include a neural network model, a deep learning neural network model, etc., which is not limited in the disclosure. The embodiment of the disclosure is described by taking people as a target object. In other embodiments, the target object may also be an animal, a cartoon character, or the like.

In S100, after the target object is identified, the first position information of each of the first feature parts in the target object may be determined. The first feature part of the target object is a key feature part on the target object, such as at least one of a head, a neck, shoulders, elbows, wrists, hips, knees and ankles. The shoulders may be divided into a left shoulder and a right shoulder, the elbows may be divided into a left elbow and a right elbow, the wrists may be divided into a left wrist and a right wrist, the hips may be divided into a left hip and a right hip, the knees may be divided into a left knee and a right knee, and the ankles may be divided into a left ankle and a right ankle. The above first feature part may also be identified by a preset feature identification algorithm, or may be identified by a trained machine learning network model. In addition, after each of the first feature parts is identified, the position information of each of the first feature parts may be determined. For the identification and determination of the first feature part, the target image may be directly input into a first preset model after training, and each of the first feature parts of the target object in the target image may be directly identified by the first preset model. Or each of the first feature parts in the target object may be directly identified by a first preset algorithm. The embodiment of the disclosure may adopt the existing technical means to perform the training and establishment of the first preset model, which is not limited. In addition, the first preset algorithm may include any feature identification algorithm.

Figure 2:
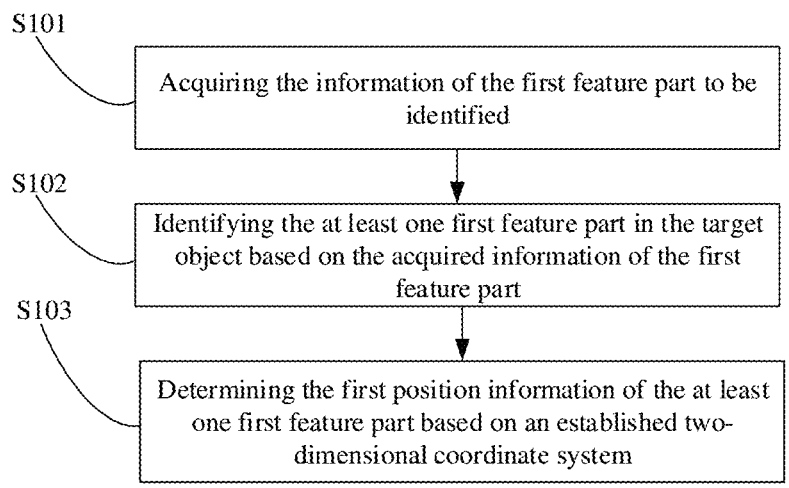
FIG. 2 shows a flow diagram of S100 in a method for pose and position detection according to an embodiment of the disclosure.

In addition, the embodiment of the disclosure may also first acquire the information of the first feature part to be identified, and then identify the position of the corresponding first feature part. FIG. 2 shows a flow diagram of S100 in a method for pose and position detection according to an embodiment of the disclosure. S100 may include:

S101: the information of the first feature part to be identified is acquired;

S102: the at least one first feature part in the target object is identified based on the acquired information of the first feature part; and S103: the first position information of the at least one first feature part is determined based on an established two-dimensional coordinate system.

Firstly, the information of the first feature part to be identified may be acquired. The first feature part as mentioned above may include at least one of a head, a neck, shoulders, elbows, wrists, hips, knees and ankles. At this time, the acquired information of the first feature part includes an identifier of the first feature part to be identified. The identifier may be the name of the corresponding feature part or a preset number, and the number may uniquely correspond to the first feature part.

Figure 3:
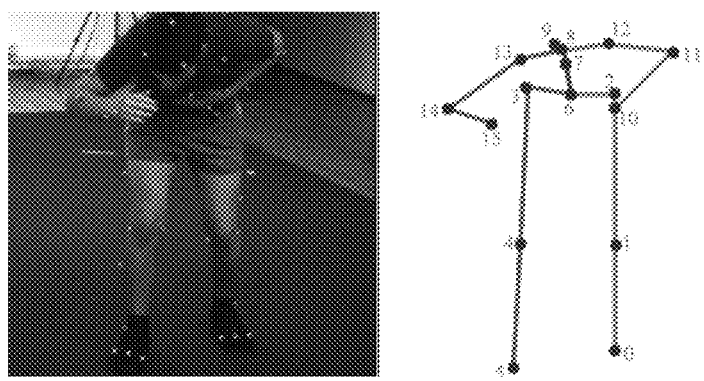
FIG. 3 shows a correspondence diagram between a target image and an identified first feature part according to an embodiment of the disclosure.

After the information of the first feature part is acquired, the identification operation of the first feature part may be performed. The identification operation may be performed according to the first preset algorithm or the first preset model. The first preset algorithm may include at least one of a local feature point detection algorithm, a speckle detection algorithm and a corner detection algorithm, or may also include other algorithms that can implement the detection and identification of the first feature part. The first preset model may be the above trained network model, such as a machine learning network model, including a neural network model, a deep learning neural network model, and the like. FIG. 3 shows a correspondence diagram between a target image and an identified first feature part according to an embodiment of the disclosure. Each of the first feature parts is identified in a mode of dots.

After each of the first feature parts is identified, S103 may be performed, the first position information of each of the first feature parts is determined based on an established rectangular coordinate system, and each piece of the first position information is expressed in a form of two-dimensional coordinates, such as (x, y).

Here, the determination of the first position information may also be implemented by the above first preset model. The model may implement the identification of the first feature part and the determination of the corresponding position information. Or, each piece of the first position information may be determined by the identified relative position between the first feature parts. For example, the position of one of the first feature parts is taken as the origin of coordinates, and the position coordinates of the remaining first feature parts may be determined by means of the relative position relationship between the first feature parts. The above is only an exemplary description of determining the first position information, which is not limited by the embodiment of the disclosure.

After the first position information of each of the first feature parts of the target object is determined, the three-dimensional position information of the second feature parts of the target object may be determined according to the device parameters of the camera device that takes the target image. The three-dimensional position information refers to the position information in a three-dimensional coordinate system, the first position information is the position information in a two-dimensional coordinate system, and the pose of the target object may be detected more accurately by the three-dimensional position information.

Figure 4:
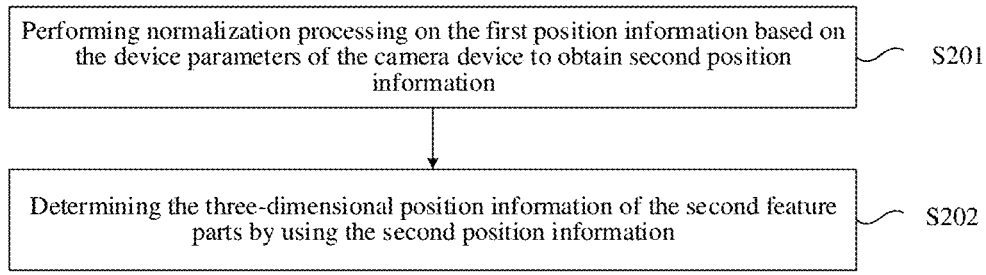
FIG. 4 shows a flow diagram of S200 in a method for pose and position detection according to an embodiment of the disclosure.

The embodiment of the disclosure may first perform normalization processing on the first position information of each of the first feature parts by means of the parameters of the camera device to remove the differential influence of different device parameters on the position information, and then perform the conversion of the two-dimensional coordinates of the first feature part to the three-dimensional coordinates of the second feature part according to the first position information after the normalization processing, so as to acquire the three-dimensional position information. FIG. 4 shows a flow diagram of S200 in a method for pose and position detection according to an embodiment of the disclosure. S200 in the embodiment of the disclosure may include:

S201: normalization processing is performed on the first position information based on the device parameters of the camera device to obtain second position information; and S202: the three-dimensional position information of the second feature parts is determined by using the second position information.

The embodiment of the disclosure may use a second preset model to implement the determination of the three-dimensional position information of the second feature parts based on the second position information of each of the first feature parts. In the embodiment of the disclosure, the first feature part may be included in the second feature part. For example, the second feature part may be the same as the first feature part, or may have more feature parts than the first feature part. In the embodiment of the disclosure, the second feature part may include at least one first feature part, or may include other feature parts other than the first feature part. For example, in the embodiment of the disclosure, compared with the first feature part, the second feature part may also include at least one of a midpoint of the crotches, a midpoint of the lumbar vertebrae, a nose and a midpoint of the spines. The midpoint of the crotches may be determined according to the positions of the left and right hips, the midpoint of the spines may be determined according to the cervical vertebrae and the midpoint of the crotches, the midpoint of the lumbar vertebrae may also be determined according to the cervical vertebrae and the midpoint of the crotches, and the nose may be determined based on head feature points.

Figure 5:
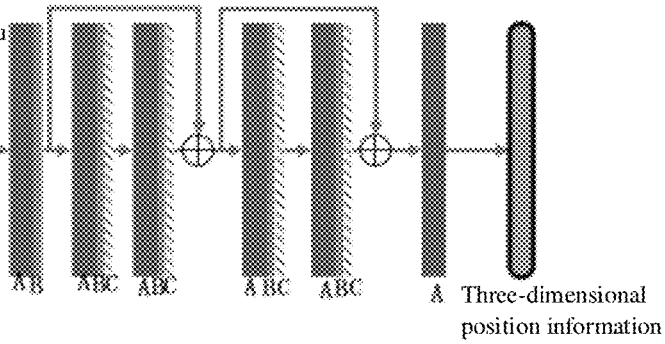
FIG. 5 shows a schematic structural diagram of a second preset model for determining three-dimensional position information of second feature parts by means of each piece of the second position information according to an embodiment of the disclosure.

FIG. 5 shows a schematic structural diagram of a second preset model for determining three-dimensional position information of second feature parts by means of each of second position information according to an embodiment of the disclosure. The second position information of each of the first feature parts may be input into the second preset model, and the three-dimensional position information of the corresponding second feature part may be acquired by a learning operation of the second preset model. The second preset model may include a deep learning model. The second preset model may include a full connection layer A, a batch processing and ReLU function layer B, and a dropout function layer C. The generating process of the second preset model will not be described in detail in the embodiment of the disclosure. A large amount of information about the first feature part in a form of two-dimensional coordinates may be learned and trained to optimize the generated machine learning model. For example, about 300,000 sets of data are prepared, and each set of data includes two-dimensional human skeleton coordinates and corresponding three-dimensional human skeleton coordinates. Mathematical expressions are $(x_1, y_1, x_2, y_2, \ldots, x_{14}, y_{14})$ and $(X_1, Y_1, Z_1, \ldots, X_{17}, Y_{17}, Z_{17})$, wherein x1 . . . x14 respectively represent horizontal coordinate values of the second position information of 14 first feature parts, y1 . . . y14 respectively represent vertical coordinate values of the second position information of the 14 first feature parts, and (X, Y, Z) respectively represent coordinate values of the generated three-dimensional position information of the second feature part. The number of the first feature part and the second feature part may be set according to requirements, and the second preset model may complete the determination of the second feature part according to the corresponding configuration information.

Further, the three-dimensional position information may be corrected by means of the first position information and the three-dimensional position information corresponding to the matched first feature part and second feature part, and the spatial position and pose of the target object is determined according to the corrected three-dimensional position information.

Based on the above configuration of the embodiment of the disclosure, the differential influence on the position information of the feature part due to different device parameters may be reduced according to the device parameters of the camera device, and at the same time, the three-dimensional position is corrected according to the two-dimensional position information and three-dimensional position information of the corresponding feature part, so as to improve the accuracy of pose detection.

Figure 6:
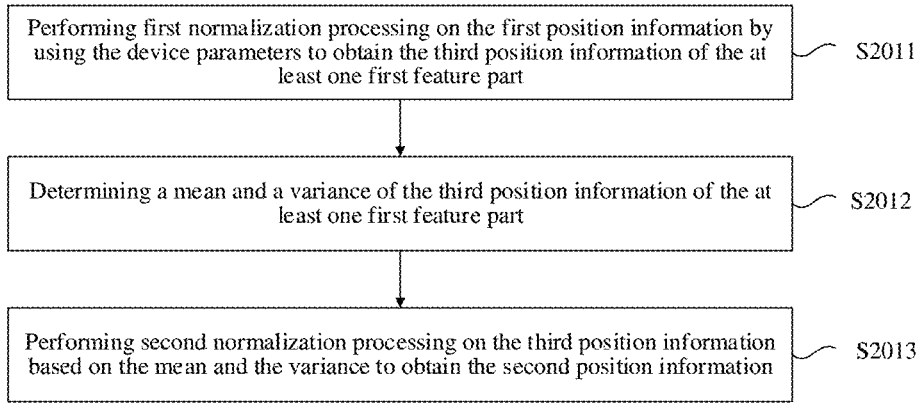
FIG. 6 shows a flow diagram of S201 in a method for pose and position detection according to an embodiment of the disclosure.

The embodiment of the disclosure will be described in detail below. As described in the above embodiment, the embodiment of the disclosure may perform normalization processing on the first position information of each of the first feature parts acquired in S100 to acquire corresponding second position information, so as to eliminate the influence of the device parameter difference on position information detection. FIG. 6 shows a flow diagram of S201 in a method for pose and position detection according to an embodiment of the disclosure. S201 may include:

S2011: first normalization processing is performed on the first position information by using the device parameters to obtain third position information of the at least one first feature part;

S2012: a mean and a variance of the third position information of the at least one first feature part are determined; and S2013: second normalization processing is performed on the third position information based on the mean and the variance to obtain the second position information.

In the embodiment of the disclosure, when the normalization processing on the first position information is performed, first normalization processing may be performed on the first position information of each of the first features by using the device parameters to obtain third position information of each of the first feature parts. The distortion error of each of the first position information caused by the parameters of the camera device may be removed by means of the first normalization processing, and then, the normalization processing is performed by means of the first position information after the distortion processing to obtain the third position information, so as to further normalize the differential influence caused by different device parameters.

Figure 7:
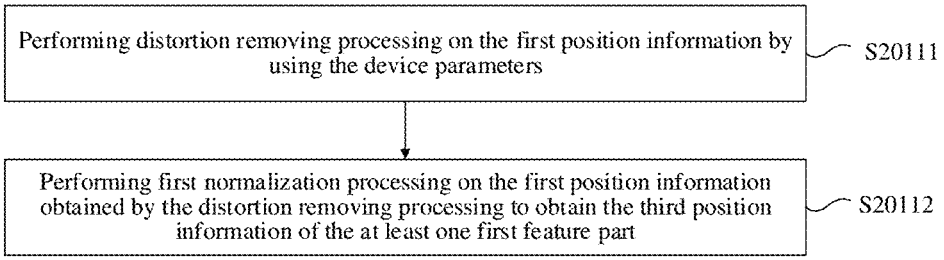
FIG. 7 shows a flow diagram of S2011 in a method for pose and position detection according to an embodiment of the disclosure.

FIG. 7 shows a flow diagram of S2011 in a method for pose and position detection according to an embodiment of the disclosure. S201 may include:

S20111: distortion removing processing is performed on the first position information by using the device parameters; and S20112: first normalization processing is performed on the first position information obtained by the distortion removing processing to obtain the third position information of the at least one first feature part. The distortion removing processing may be performed on the first position information by means of a first formula, wherein the first formula may include:

$$x' = (x - c_x)/f_x$$
$$y' = (y - c_y)/f_y;$$
$$r = x'^2 + y'^2$$

Formula 1

-continued
$$t = \frac{1+((k_6r^2+k_5)r^2+k_4)r^2}{1+((k_3r^2+k_2)r^2+k_1)r^2}$$
$$\Delta x = 2p_1x'y' + p_2(r^2+2x'^2)$$
$$\Delta y = p_1(r^2+2y'^2) + 2p_2x'y'$$
$$u' = (x'-\Delta x)t$$
$$v' = (y'-\Delta y)t$$
$$u = u'f_x + c_x$$
$$v = v'f_x + c_y$$

wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $k_1$, $k_2$, $k_3$, $k_4$, $k_5$, $k_6$ respectively represent radial distortion parameters of the camera device, $p_1$, $p_2$ respectively represent tangential distortion parameters of the camera device, x and y respectively represent a horizontal coordinate value and a vertical coordinate value of the first position information, and u and v respectively represent a horizontal coordinate value and a vertical coordinate value after the distortion processing. Radial distortion refers to the change in a vector end point along a length direction, that is, the change dr in a radius vector. Tangential distortion refers to the change in a vector end point along a tangential direction, that is, the change dt in an angle.

The first position information (u, v) after the distortion processing may be acquired by means of the above first formula, and then, the first normalization processing may be performed. A formula for the first normalization processing may include:

$$x_n = \frac{u - c_x}{f_x} \quad \text{Formula 7}$$
$$y_n = \frac{v - c_y}{f_y}$$

wherein $x_n$ and $y_n$ respectively represent a horizontal coordinate value and a vertical coordinate value of the third position information after the first normalization processing. Based on the above configuration, the normalization processing may be performed after the distortion removing processing is performed, and thus, the accurate positioning of the position information may be further improved.

After the third position information of each of the first feature parts is acquired, a mean and a variance of each piece of the third position information may be determined, and second normalization processing is further performed according to the variance and the mean, so as to obtain second position information of the first feature part. In the embodiment of the disclosure, the step that the mean and variance of the third position information of each of the first feature parts are determined may include: a mean and a variance of the horizontal coordinate of the third position information are determined based on the horizontal coordinate value of the third position information of each of the first feature parts, and a mean and a variance of the vertical coordinate of the third position information are determined based on the vertical coordinate value of the third position information of each of the first feature parts. The variance and the mean of the horizontal coordinate value and the variance and the mean of the vertical coordinate value of the third position information of each of the first feature parts may be determined respectively by means of a mean formula and a variance formula.

Or, in the embodiment of the disclosure, a horizontal coordinate mean and a horizontal coordinate variance corresponding to the horizontal coordinate of each piece of the third position information and a vertical coordinate mean and a vertical coordinate variance corresponding to the vertical coordinate of each piece of the third position information may be generated based on the third position information of each of the first feature parts. That is, the horizontal coordinate of each of the third position information corresponds to respective variance and mean, and the vertical coordinate also corresponds to respective mean and variance. For example, normalization processing on the first position information may be performed by a third preset model. The third preset model may include a neural network model. The neural network model may be trained by means of a large amount of data. For example, 300,000 sets of training data may be input, and each set of training data may include the third position information of each of the input feature parts and the corresponding second position information after normalization. Based on the mean and variance of the horizontal coordinate of the third position information of each same feature part in the training data, the mean and variance of the horizontal coordinate corresponding to the feature part are determined; and based on the mean and variance of the vertical coordinate of the third position information of each same feature part in the training data, the mean and variance of the vertical coordinate corresponding to the feature part are determined.

Therefore, when the third position information of each of the first feature parts is input to the third preset model, the mean and variance of the horizontal coordinate and the mean and variance of the vertical coordinate of the corresponding feature part may be acquired correspondingly. Then, second normalization processing is performed on the third position information according to the mean and variance of each of the feature parts. The second normalization processing may be performed on the third position information based on the mean and the variance by means of a second formula, wherein the second formula includes:

$$s = \frac{x_i - \text{mean}(x_i)}{std(x_i)} \quad \text{Formula 2}$$
$$t = \frac{y_i - \text{mean}(y_i)}{std(y_i)}$$

wherein s and t respectively represent a horizontal coordinate and a vertical coordinate of the second position information of the ith first feature part, $x_i$ and $y_i$ respectively represent a horizontal coordinate value and a vertical coordinate value of the third position information of the ith first feature part, a mean function represents a mean function of the horizontal coordinate or the vertical coordinate corresponding to the first feature part, an std function represents a variance function of the horizontal coordinate or the vertical coordinate corresponding to the first feature part, and i is a positive integer.

Figure 8:
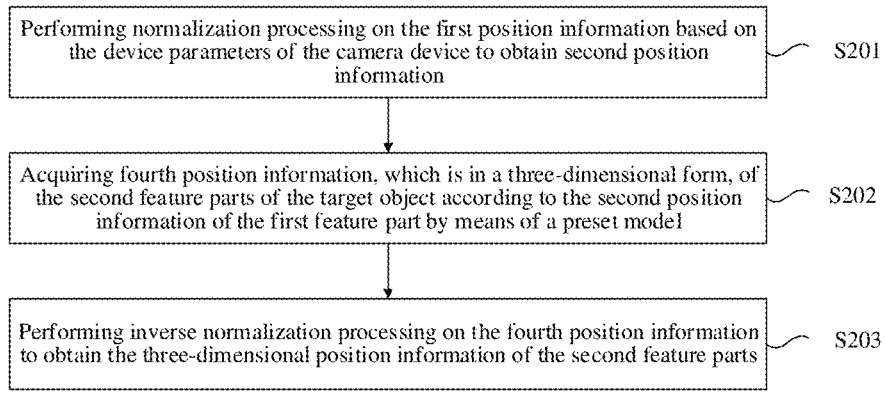
FIG. 8 shows another flow diagram of S200 in a method for pose and position detection according to an embodiment of the disclosure.

Under the condition that the second position information of each of the first feature parts is determined, a determination process of the three-dimensional position information of the second feature parts may be performed by using the second position information. In the embodiment of the disclosure, inverse normalization processing may also be performed on the three-dimensional position information of each of the second feature parts, and the three-dimensional position information after the inverse normalization processing may be used as the actual position coordinates of the target object relative to the camera device, so as to more accurately determine the pose of the target object. FIG. 8 shows another flow diagram of S200 in a method for pose and position detection according to an embodiment of the disclosure. S200 may include:

S201: normalization processing is performed on the first position information based on the device parameters of the camera device to obtain second position information;

S202: fourth position information, which is in a three-dimensional form, of the second feature parts of the target object is acquired according to the second position information of the first feature part by means of a preset model; and S203: inverse normalization processing is performed on the fourth position information to obtain the three-dimensional position information of the second feature parts.

The processing manners of S201 and S202 in the embodiment of the disclosure are the same as those of S201 and S202 in FIG. 4. The fourth position information in the embodiment of the disclosure is equivalent to the three-dimensional position information in the embodiment corresponding to FIG. 4. In the embodiment of the disclosure, the inverse normalization processing may be performed on the fourth position information to reduce the influence of training parameters and the like on the position information.

In the embodiment of the disclosure, the inverse normalization processing may also be performed on the three-dimensional position information of each of the second feature parts or the corrected three-dimensional position information, and the three-dimensional position information after the inverse normalization processing may be used as the actual position coordinates of the target object, so as to more accurately determine the pose of the target object. In the embodiment of the disclosure, the inverse normalization processing performed on the corrected three-dimensional position information is described, and a process of directly performing normalization processing on the uncorrected three-dimensional position information is similar and will not be repeated here. The process of the inverse normalization processing may include:

inverse normalization processing is performed on the corrected three-dimensional position information by means of a third formula to acquire fifth position information, wherein the third formula includes:

$$X'=X*std(X)+\text{mean}(X)$$

$$Y'=Y*std(Y)+\text{mean}(Y)$$

$$Z'=Z*std(Z)+\text{mean}(Z) \quad \text{Formula 3}$$

wherein X', Y' and Z' respectively represent three coordinate values of the three-dimensional position information, X, Y and Z respectively represent three coordinate values of the fourth position information, std represents a variance function, and mean represents a mean function.

Correspondingly, in the embodiment of the disclosure, the X coordinate mean of each piece of the fourth position information of each of the second feature parts may be acquired based on the X coordinate value of each piece of the fourth position information by means of the mean function, the Y coordinate mean of each piece of the fourth position information may be acquired based on the Y coordinate value of each piece of the fourth position information by means of the mean function, and the Z coordinate mean of each piece of the fourth position information may be acquired based on the Z coordinate value of each piece of the fourth position information by means of the mean function. In the embodiment of the disclosure, the variance of the X coordinate of each piece of the fourth position information may be acquired based on the X coordinate value and the X-coordinate mean of each piece of the fourth position information by means of the variance function, the variance of the Y coordinate of each piece of the fourth position information may be acquired based on the Y coordinate value and the Y coordinate mean of each piece of the fourth position information by means of the variance function, and the variance of the Z coordinate of each piece of the fourth position information may be acquired based on the Z coordinate value and the Z coordinate mean of each piece of the fourth position information by means of the variance function.

Or, in the embodiment of the disclosure, the mean function may also be the mean of X, Y or Z of the three-dimensional position information of the corresponding feature part respectively, and the std function may be the variance of the X, Y or Z of the corrected three-dimensional position information of the corresponding feature part respectively. That is, the fourth position information of each of the second feature parts may have the corresponding mean and variance of X, the corresponding mean and variance of Y, and the corresponding mean and variance of Z. When the third preset model is trained by means of training data, during the training process, the mean and variance of X, the mean and variance of Y and the mean and variance of Z in each piece of the fourth position information of each of the second feature parts in actual applications may be determined respectively according to each piece of the acquired fourth position information. For example, the mean and variance of X, the mean and variance of Y and the mean and variance of Z of the fourth position information of a head feature part generated in the training data may be acquired, and correspondingly, the mean and variance of X, the mean and variance of Y and the mean and variance of Z of the fourth position information of other feature parts may also be acquired, so that the mean and variance of X, the mean and variance of Y and the mean and variance of Z of the fourth position information of each of the feature parts may be acquired.

Therefore, the inverse normalization processing on each of the second feature parts may be performed by means of the mean and variance of the fourth position information of the corresponding feature part to reduce the influence caused by training data, so as to acquire accurate three-dimensional position information of each of the second feature parts, and finally, the pose of the target object is acquired according to the three-dimensional position information of the second feature parts.

Figure 9:
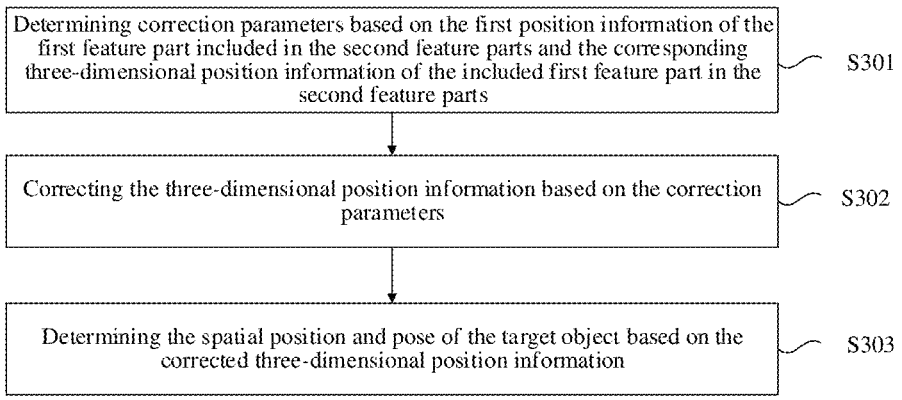
FIG. 9 shows a flow diagram of S300 in a method for pose and position detection according to an embodiment of the disclosure.

In the embodiment of the disclosure, after the three-dimensional position information is determined, the three-dimensional position information may also be corrected to determine the corresponding spatial pose. FIG. 9 shows a flow diagram of S300 in a method for pose and position detection according to an embodiment of the disclosure. S300 may include:

S301: correction parameters are determined based on the first position information of the first feature part included in the second feature parts and the corresponding three-dimensional position information of the included first feature part in the second feature part;

S302: the three-dimensional position information is corrected based on the correction parameters; and S303: the spatial position and pose of the target object is determined based on the corrected three-dimensional position information.

As described in the above embodiment, the second feature part in the embodiment of the disclosure may include at least one first feature part, or may include other feature parts other than the first feature part. Therefore, when the correction of the three-dimensional position information is performed, it is first necessary to correspondingly determine the same feature part in the first feature part and the second feature part, and the same feature part refers to the first feature part included in the second feature part. Both the first feature part and the second feature part in the embodiment of the disclosure may correspondingly have identifier information. For example, the first feature part may correspondingly have a first identifier, and the second feature part may correspondingly have a second identifier. Therefore, the same feature part may be determined by matching the identifier information of the corresponding first feature part and second feature part. For example, the first feature part and the second feature part having the same identifier information are configured to determine correction parameters, and the first feature part and the second feature part having the same identifier information are the same feature part actually. Or, there may be a corresponding mapping relationship between the first identifier and the second identifier of the same feature part. Therefore, the first feature part and the second feature part corresponding to the first identifier and the second identifier which are related to each other may be regarded as the same feature part. Here, the identifier information may be a unique identifier allocated to the feature part, which may be a number or a name In addition, the three-dimensional position information in S301 may include the three-dimensional position information in the embodiment of FIG. 4 or the three-dimensional position information in the embodiment of FIG. 8.

Figure 10:
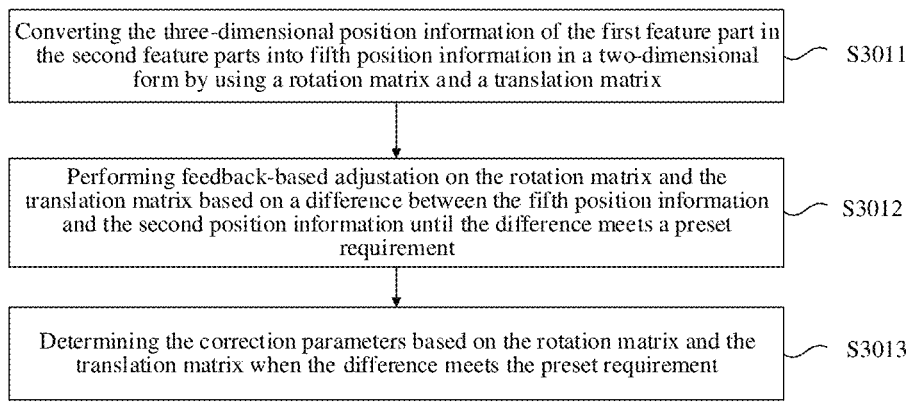
FIG. 10 shows a flow diagram of S301 in a method for pose and position detection according to an embodiment of the disclosure.

In the embodiment of the disclosure, based on the determined same feature part, a determination process of the correction parameters may be performed. FIG. 10 shows a flow diagram of S301 in a method for pose and position detection according to an embodiment of the disclosure. S301 may include:

S3011: the three-dimensional position information of the first feature part in the second feature parts is converted into fifth position information in a two-dimensional form by using a rotation matrix and a translation matrix;

S3012: feedback-based adjustment is performed on the rotation matrix and the translation matrix based on a difference between the fifth position information and the second position information until the difference meets a preset requirement, wherein the second position information is obtained based on a normalization processing of the first position information; and S3013: the correction parameters are determined based on the rotation matrix and the translation matrix when the difference meets the preset requirement.

In the embodiment of the disclosure, since the second position information acquired by performing the normalization processing on the first position information of the first feature part is in a form of two-dimensional coordinates, and the three-dimensional position information is in a form of three-dimensional coordinates, it is necessary to unify the two forms of coordinates so as to determine the correction parameters. In the embodiment of the disclosure, the three-dimensional position information may be converted into fourth position information in a two-dimensional form by means of the rotation matrix and the translation matrix. The rotation matrix is a rotation vector of the target object relative to the camera device, and the translation matrix is a translation vector of the target object relative to the camera device. In the embodiment of the disclosure, a correction process of the three-dimensional position information may be performed by means of the above third preset model. The third preset model may perform conversion of the three-dimensional position information in a two-dimensional form according to the pre-configured rotation matrix and translation matrix. For example, the three-dimensional position information may be converted into fifth position information in a two-dimensional form by means of the rotation matrix and the translation matrix according to a fourth formula, wherein the fourth formula may include:

$$S_5 = K[R|T]\square S_3 \quad \text{Formula 4}$$

$$K = \begin{pmatrix} f_x & 0 & c_x \\ 0 & f_y & c_y \\ 0 & 0 & 1 \end{pmatrix}$$

wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $S_5$ represents the fifth position information, and S3 represents the three-dimensional position information.

In addition, the third preset model may also adjust the rotation matrix and the translation matrix according to the difference feedback between the second position information and the fifth position information of the corresponding feature part until the difference between the second position information and the fifth position information of all feature parts meets the preset requirements. Meeting the preset requirements may include that the distance between two pieces of position information is less than a preset distance threshold, wherein the preset distance threshold may be a value pre-configured according to needs, and may be set to different values in different embodiments. At the same time, the rotation matrix and the translation matrix when the difference meets the preset requirements may be used as the correction parameters.

Or, in some other embodiments of the disclosure, feedback adjustment on the rotation matrix and the translation matrix may also be performed by means of an optimization model, wherein the expression of the optimization model includes:

$$\underset{R,T}{\text{argmin}} K[R][T]\square S_3 - S_2 \quad \text{Formula 6}$$

wherein an arg min function represents a difference minimization function, and S2 represents the second position information. That is, in the embodiment of the disclosure, the rotation matrix R and the translation matrix T may be adjusted by means of the optimization model so as to minimize the difference between the fifth position information and the second position information. Here, the optimization model may include a neural network model or other machine learning models.

In addition, after the rotation matrix R and the translation matrix T when the preset conditions are met are acquired, the three-dimensional position information may be corrected based on the correction parameters, which may include: the three-dimensional position information is corrected by means of a fifth formula, wherein the fifth formula includes:

$$P'=P*R+T \qquad \text{Formula 5}$$

wherein P represents the three-dimensional position information before correction, P' represents the corrected three-dimensional position information, R represents the rotation matrix, and T represents the translation matrix.

That is, the three-dimensional position information may be corrected by means of the rotation matrix and translation matrix corresponding to the difference meeting the preset requirements to acquire the corrected three-dimensional position information, and then, the spatial position and pose of the target object may be determined by means of the three-dimensional position information. In the embodiment of the disclosure, the spatial pose may be determined directly by means of the corrected three-dimensional position information of each of the second feature parts, so as to improve the accuracy of pose detection.

In order to more clearly describe the embodiment of the disclosure, the following illustrates the process of the pose detection algorithm of the embodiment of the disclosure, which may include:

image data is acquired, wherein the image data may include videos or pictures;

key point positions of 14 points on an image, that is, first position information of 14 first feature parts, may be acquired by means of a two-dimensional human key point detection tool;

a corresponding three-dimensional human skeleton (17 key points, wherein the position of the key point at the pelvis is fixed as the origin) is acquired by means of two-dimensional key point position information, wherein the 17 key points are three-dimensional position information of three-dimensional key points;

two human key point models acquired in the above steps are aligned (that is, the same feature parts are determined), so that each of the key points is consistent in the physical significance; and an internal parameter K of the current device is known, and then, external parameters, including a rotation matrix R and a translation matrix T, of a target human body in a camera coordinate system may be calculated. As described in a formula 4, $$K = \begin{pmatrix} f_x & 0 & c_x \\ 0 & f_y & c_y \\ 0 & 0 & 1 \end{pmatrix}$$

wherein $f_x$, $f_y$, $c_x$ and $c_y$ may be acquired by calibrating the current device with the Zhang Zhengyou calibration method. Assuming the aligned two-dimensional human skeleton $S_2$ and three-dimensional human skeleton $S_3$, an optimized formula may be:

$$\underset{R,T}{\mathrm{argmin}} K[R][T] \square S_3 - S_2 \qquad \text{Formula 8}$$

After the optimized R and T are determined, the three-dimensional position information may be corrected. For example, P' is acquired by means of P'=P*R+T so as to determine the pose.

Since video data may be used as image data in the embodiment of the disclosure, when the optimization operation of the R and T is performed, the R and T of the previous frame may be used as the initial value of the next frame, so as to further improve the optimization accuracy.

In conclusion, in the embodiments of the disclosure, pose detection of an object in an image is performed by combining device parameters, the influence of different device parameters on pose detection may be eliminated, and the accuracy of pose detection may be improved. At the same time, in the embodiments of the disclosure, the adjustment on the correction parameters of the three-dimensional position information may be determined by means of the difference between the first position information and the three-dimensional position information, so as to further improve the accuracy of the pose detection.

Those skilled in the art can understand that in the above method of the specific implementation manner, the writing order of the steps does not imply a strict execution order and does not constitute any limitation to the implementation process. The specific execution order of the steps should be determined by its functions and possible internal logics.

Figure 11:
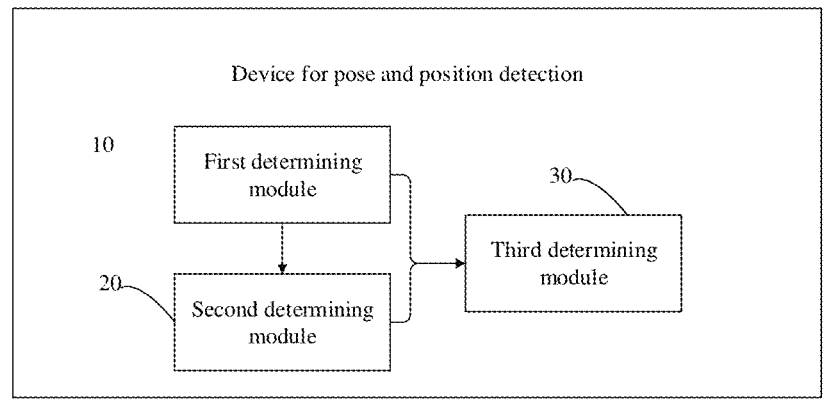
FIG. 11 shows a block diagram of a device for pose and position detection according to an embodiment of the disclosure.

FIG. 11 shows a block diagram of a device for pose and position detection according to an embodiment of the disclosure. The device may include:

a first determining module 10 configured to determine first position information of at least one first feature part of a target object within a target image, wherein the target image is taken by a camera device;

a second determining module 20 configured to determine three-dimensional position information of second feature parts of the target object based on the first position information and device parameters of the camera device, wherein the second feature parts at least include the first feature part; and a third determining module 30 configured to determine the spatial position and pose of the target object based on the first position information of the at least one first feature part included in the second feature parts and the three-dimensional position information of the second feature parts.

In the embodiment of the disclosure, the first determining module includes:

an information acquisition unit configured to acquire the information of the first feature part to be identified;

a feature identification unit configured to identify the at least one first feature part in the target object based on the acquired information of the first feature part; and a two-dimensional position determining unit configured to determine the first position information of the at least one first feature part based on an established two-dimensional coordinate system.

In the embodiment of the disclosure, the second determining module includes:

a normalization unit configured to perform normalization processing on the first position information based on the device parameters of the camera device to obtain second position information; and a three-dimensional position determining unit configured to determine the three-dimensional position information of the second feature parts by using the second position information.

In the embodiment of the disclosure, the normalization unit is further configured to perform first normalization processing on the first position information by using the device parameters to obtain third position information of the at least one first feature part, determine a mean and a variance of the third position information of the at least one first feature part, and perform second normalization processing on the third position information based on the mean and the variance to obtain the second position information.

In the embodiment of the disclosure, the normalization unit is further configured to perform distortion removing processing on the first position information by using the device parameters, and perform first normalization processing on the first position information obtained by the distortion removing processing to obtain the third position information of each first feature part.

In the embodiment of the disclosure, the normalization unit is further configured to perform the distortion removing processing on the first position information by means of a first formula, wherein the first formula includes:

$$x' = (x - c_x)/f_x$$
$$y' = (y - c_y)/f_y;$$
$$r = x'^2 + y'^2$$
$$t = \frac{1 + ((k_6 r^2 + k_5)r^2 + k_4)r^2}{1 + ((k_3 r^2 + k_2)r^2 + k_1)r^2}$$
$$\Delta x = 2p_1 x' y' + p_2(r^2 + 2x'^2)$$
$$\Delta y = p_1(r^2 + 2y'^2) + 2p_2 x' y'$$
$$u' = (x' - \Delta x)t$$
$$v' = (y' - \Delta y)t$$
$$u = u' f_x + c_x$$
$$v = v' f_x + c_y$$

Formula 1 wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $k_1$, $k_2$, $k_3$, $k_4$, $k_5$, $k_6$ respectively represent radial distortion parameters of the camera device, $p_1$, $p_2$ respectively represent tangential distortion parameters of the camera device, x and y respectively represent a horizontal coordinate value and a vertical coordinate value of the first position information, and u and v respectively represent a horizontal coordinate value and a vertical coordinate value after the distortion processing.

In the embodiment of the disclosure, the normalization unit is further configured to perform second normalization processing on the third position information based on the mean and the variance by means of a second formula, wherein the second formula includes:

$$s = \frac{x_i - \text{mean}(x_i)}{\text{std}(x_i)}$$
$$t = \frac{y_i - \text{mean}(y_i)}{\text{std}(y_i)}$$

Formula 2 wherein s and t respectively represent a horizontal coordinate and a vertical coordinate of the second position information, $x_i$ and $y_i$ respectively represent a horizontal coordinate value and a vertical coordinate value of the third position information of the ith first feature, a mean function represents a mean function, an std function represents a variance function, and i is a positive integer.

In the embodiment of the disclosure, the three-dimensional position determining unit is further configured to acquire the three-dimensional position information of the second feature parts of the target object according to the second position information of the first feature part by means of a preset model,
wherein the preset model includes a deep learning model.

In the embodiment of the disclosure, the second determining module includes:
a normalization unit configured to perform normalization processing on each piece of the first position information based on the device parameters of the camera device to obtain second position information;
a three-dimensional position determining unit configured to determine fourth position information, which is in a three-dimensional form, of the second feature parts by using the second position information; and
an inverse normalization unit configured to perform inverse normalization processing on the fourth position information to acquire the three-dimensional position information of each of the second feature parts.

In the embodiment of the disclosure, the inverse normalization unit is further configured to perform inverse normalization processing on each piece of the fourth position information by means of a third formula to acquire the three-dimensional position information, wherein the third formula includes:

$$X'=X*\text{std}(X)+\text{mean}(X)$$
$$Y'=Y*\text{std}(Y)+\text{mean}(Y)$$
$$Z'=Z*\text{std}(Z)+\text{mean}(Z)$$

Formula 3 wherein X', Y' and Z' respectively represent three coordinate values of the three-dimensional position information, X, Y and Z respectively represent three coordinate values of the fourth position information, std represents a variance function, and mean represents a mean function.

In the embodiment of the disclosure, the third determining module includes:
a correction parameter determining unit configured to determine correction parameters based on the first position information of the first feature part included in the second feature parts and the corresponding three-dimensional position information of the included first feature part in the second feature part;
a correction unit configured to correct the three-dimensional position information based on the correction parameters; and
a position and pose determining unit configured to determine the spatial position and pose of the target object based on the corrected three-dimensional position information.

In the embodiment of the disclosure, the correction parameter determining unit is further configured to convert the three-dimensional position information of the first feature part in the second feature parts into fifth position information in a two-dimensional form by using a rotation matrix and a translation matrix;
perform feedback-based adjustation on the rotation matrix and the translation matrix based on a difference between the fifth position information and the second position information until the difference meets the preset requirement, wherein the second position information is obtained based on a normalization processing of the first position information; and determine the correction parameters based on the rotation matrix and the translation matrix when the difference meets the preset requirement.

In the embodiment of the disclosure, the correction parameter determining unit is further configured to convert the three-dimensional position information into the fifth position information in a two-dimensional form by means of the rotation matrix and the translation matrix according to a fourth formula, wherein the fourth formula includes:

$$S_5 = K[R|T]\Box S_3 \quad \text{Formula 4}$$

$$K = \begin{pmatrix} f_x & 0 & c_x \\ 0 & f_y & c_y \\ 0 & 0 & 1 \end{pmatrix}$$

wherein $f_x$ represents a focal length of the camera device on the x axis, $f_y$ represents a focal length of the camera device on the y axis, $c_x$ and $c_y$ respectively represent a horizontal coordinate value and a vertical coordinate value of an optical center coordinate position of the camera device, $S_5$ represents the fifth position information, and $S_3$ represents the three-dimensional position information.

In the embodiment of the disclosure, the correction parameter determining unit is further configured to perform feedback adjustment on the rotation matrix and the translation matrix by means of an optimization model, wherein the expression of the optimization model includes:

$$\underset{R,T}{\mathrm{argmin}} K[R][T]\Box S_3 - S_2 \quad \text{Formula 6}$$

wherein an arg min function represents a difference minimization function, and S2 represents the second position information.

In the embodiment of the disclosure, the correction unit is further configured to correct the three-dimensional position information by means of a fifth formula, wherein the fifth formula includes:

$$P'=P*R+T \quad \text{Formula 5}$$

wherein P represents the three-dimensional position information before correction, P' represents the corrected three-dimensional position information, R represents the rotation matrix, and T represents the translation matrix.

In the embodiment of the disclosure, the third determining module further includes:

a matching unit configured to determine the at least one first feature part included in the second feature parts based on the first identifier of the first feature part and the second identifier of the second feature part.

In the embodiment of the disclosure, the device further includes:

an image acquisition module configured to acquire a target image; and an object identification module configured to identify a target object in the target image.

In the embodiment of the disclosure, the first feature part includes at least one of a head, a neck, shoulders, elbows, wrists, hips, knees and ankles.

In some embodiments, the functions or modules of the device provided by the embodiments of the disclosure may be configured to perform the methods described in the above method embodiments. For the specific implementation, reference may be made to the description of the above method embodiments. For brevity, the details are not described here.

An embodiment of the disclosure further provides a computer-readable storage medium in which a computer program instruction is stored. When the computer program instruction is performed by a processor, the above method is implemented. The computer-readable storage medium may be a non-volatile computer-readable storage medium.

An embodiment of the disclosure further provides an electronic device, including: a processor, and a memory configured to store executable instructions of the processor, wherein the processor is configured to perform the above method.

An embodiment of the disclosure further provides a computer program, including computer-readable codes. When the computer-readable codes run in the electronic device, the processor in the electronic device performs the above method.

The electronic device may be provided as a terminal, a server or devices in other forms.

Figure 12:
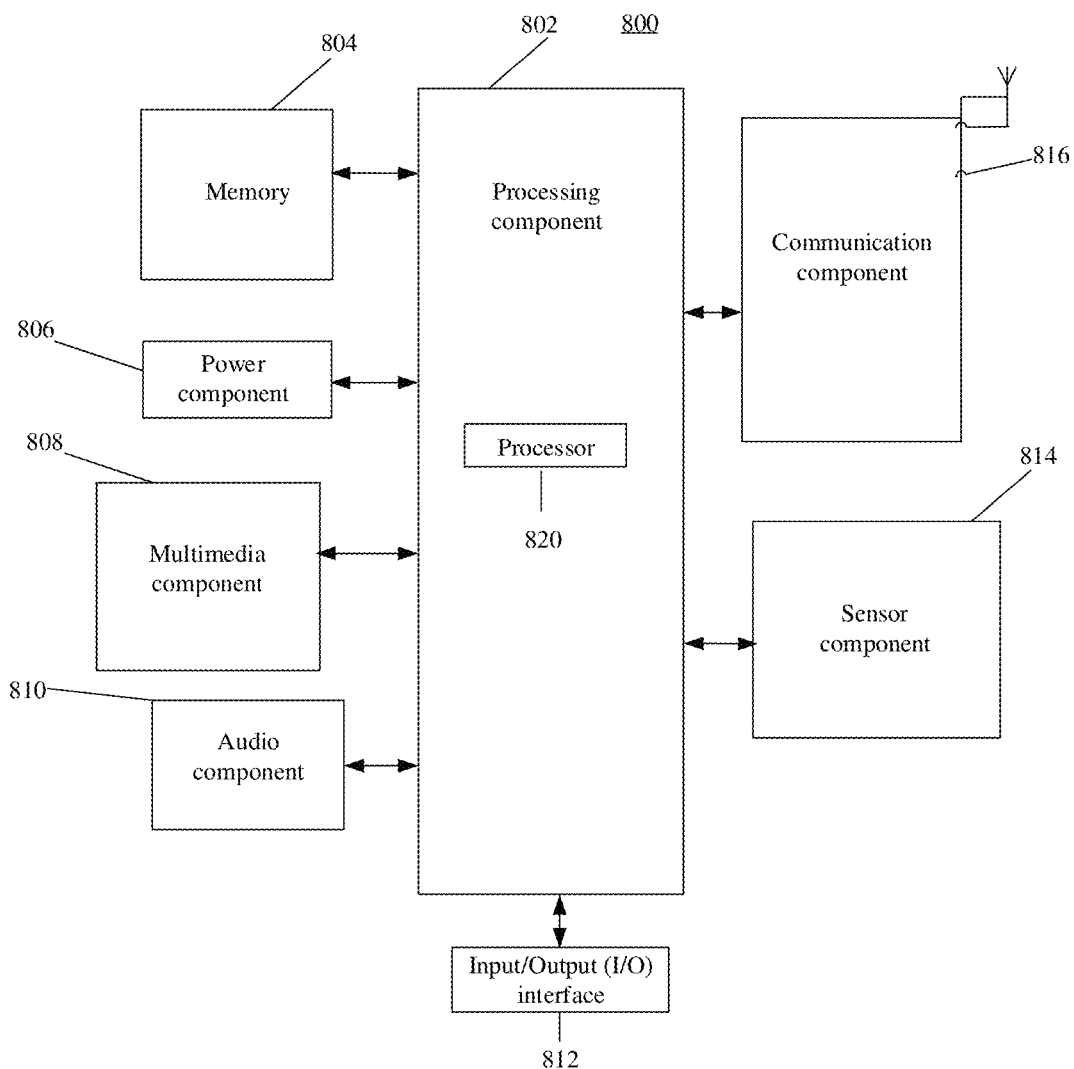
FIG. 12 shows a block diagram of an electronic device according to an embodiment of the disclosure.

FIG. 12 is a block diagram of an electronic device 800 according to an exemplary embodiment. For example, the electronic device 800 may be a mobile phone, a computer, a digital broadcast terminal, a messaging device, a game console, a tablet device, a medical device, a fitness device, a personal digital assistant, and the like.

Referring to FIG. 12, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the electronic device 800, such as operations associated with display, telephone calls, data communications, camera operations, and recording operations. The processing component 802 may include one or a plurality of processors 820 to perform instructions to complete all or part of the steps of the method described above. In addition, the processing component 802 may include one or a plurality of modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented by any type of volatile or non-volatile memory devices or combinations thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or a compact disk.

The power component 806 provides power to various components of the electronic device 800. The power component 806 may include a power management system, one or more power sources, and any other components associated with the generation, management and distribution of power in the electronic device 800.

The multimedia component 808 includes a screen providing an output interface between the electronic device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 808 includes a front camera and/or a rear camera. The front camera and/or the rear camera may receive external multimedia date while the electronic device 800 is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 includes a Microphone (MIC) configured to receive external audio signals when the electronic device 800 is in an operation mode, such as a call mode, a recording mode, and a voice recognition mode. The received audio signals may be further stored in the memory 804 or sent via the communication component 816. In some embodiments, the audio component 810 further includes a speaker configured to output audio signals.

The I/O interface 812 provides an interface between the processing component 802 and peripheral interface modules, such as a keyboard, a click wheel, or buttons. These buttons may include, but not limited to: a home button, a volume button, a start button, and a lock button.

The sensor component 814 includes one or more sensors to provide status assessments of various aspects of the electronic device 800. For example, the sensor component 814 may detect an open/closed status of the electronic device 800, and relative positioning of components. For example, the component is the display and the keypad of the electronic device 800. The sensor component 814 may also detect a change in position of the electronic device 800 or a component of the electronic device 800, a presence or absence of user contact with the electronic device 800, a pose or an acceleration/deceleration of the electronic device 800, and a change in temperature of the electronic device 800. The sensor component 814 may include a proximity sensor configured to detect the existence of nearby objects under the situation of no physical contact. The sensor component 814 may also include an optical sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate wired or wireless communication between the electronic device 800 and other devices. The electronic device 800 may access a wireless network based on a communication standard, such as WiFi, 2G, or 3G, or a combination thereof. In an exemplary embodiment, the communication component 816 receives broadcast signals or broadcast related information from an external broadcast management system via a broadcast channel In an exemplary embodiment, the communication component 816 further includes an NFC module to facilitate short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In exemplary embodiments, the electronic device 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, for performing the above described methods.

In an exemplary embodiment, a non-volatile computer-readable storage medium, such as a memory 804 including a computer program instruction, is further provided. The above computer program instruction may be performed by a processor 820 of the electronic device 800 to complete the above method.

Figure 13:
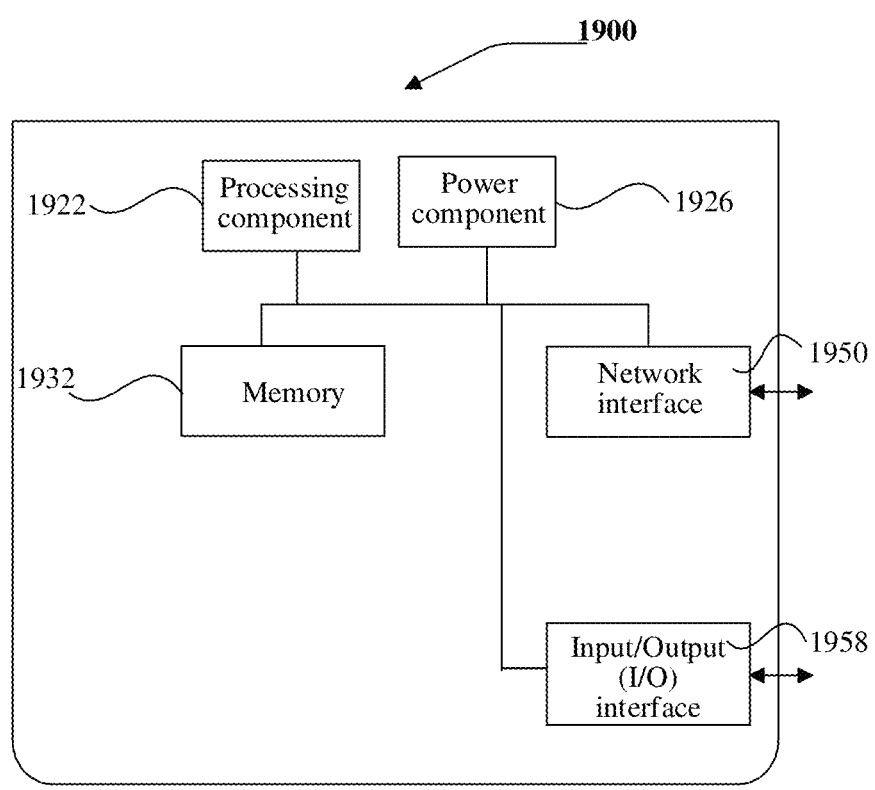
FIG. 13 shows a block diagram of another electronic device according to an embodiment of the disclosure.

FIG. 13 shows a block diagram of another electronic device according to an embodiment of the disclosure. For example, an electronic device 1900 may be provided as a server. Referring to FIG. 13, the electronic device 1900 includes a processing component 1922, further including one or more processors and memory resources represented by a memory 1932 for storing instructions capable of being performed by the processing component 1922, such as application programs. The application program stored in the memory 1932 may include one or more modules each of which corresponds to a set of instructions. Furthermore, the processing component 1922 is configured to perform instructions to perform the above method.

The electronic device 1900 may also include a power component 1926 configured to perform power management of the electronic device 1900, a wired or wireless network interface 1950 configured to connect the electronic device 1900 to the network, and an Input/Output (I/O) interface 1958. The electronic device 1900 may operate an operating system stored in the memory 1932, such as Windows Server™, Mac OS X™, Unix™, Linux™, FreeBSD™ or the like.

In an exemplary embodiment, a non-volatile computer-readable storage medium, such as a memory 1932 including a computer program instruction, is further provided. The above computer program instruction may be performed by the processing component 1922 of the electronic device 1900 to complete the above method.

The disclosure may be a system, a method, and/or a computer program product. The computer program product may include a computer-readable storage medium loaded with computer-readable program instructions for enabling the processor to implement various aspects of the disclosure.

The computer-readable storage medium may be a tangible device that can hold and store instructions used by an instruction execution device. The computer-readable storage medium may be, but not limited to, an electrical storage device, a magnetic storage device, an optical storage device, an electromagnetic storage device, a semiconductor storage device, or any appropriate combination of the above devices. More specific examples (non-exhaustive lists) of the computer-readable storage medium include: a portable computer disk, a hard disk, a Random Access Memory (RAM), a Read Only Memory (ROM), an Erasable Programmable Read Only Memory (EPROM) or a flash memory, a Static Random Access Memory (SRAM), a portable Compact Disk Read Only Memory (CD-ROM), a Digital Video Disk (DVD), a memory stick, a floppy disk, a mechanical coding device such as a punched card or a groove internally-raised structure on which instructions are stored, and any appropriate combination of the above components. The computer-readable storage medium used here is not interpreted as a transient signal itself, such as radio waves or other freely propagating electromagnetic waves, electromagnetic waves propagating through wave guides or other transmission media (such as optical pulses passing through optical fiber cables), or electrical signals transmitted through wires.

The computer-readable program instructions described here may be downloaded from the computer-readable storage medium to various computing/processing devices, or to an external computer or an external storage device through a network, such as the Internet, a Local Area Network (LAN), a Wide Area Network (WAN) and/or a wireless network. The network may include copper transmission cables, optical fiber transmissions, wireless transmissions, routers, firewalls, switches, gateway computers, and/or edge servers. A network adapter card or a network interface in each of computing/processing devices receives the computer-readable program instructions from the network and forwards the computer-readable program instructions for storage in the computer-readable storage medium in each of the computing/processing devices.

Computer program instructions for performing the operations of the disclosure may be assembly instructions, Instruction Set Architecture (ISA) instructions, machine instructions, machine-related instructions, micro-codes, firmware instructions, state setting data, or source codes or object codes written in any combination of one or more programming languages. The programming languages include object-oriented programming languages, such as Smalltalk and C++, as well as conventional procedural programming languages, such as "C" language or similar programming languages. The computer-readable program instructions may be completely performed on a user computer, partially performed on a user computer, performed as an independent software package, partially performed on a user computer and partially performed on a remote computer, or completely performed on a remote computer or server. In the case where a remote computer is involved, the remote computer may be connected to a user computer through any type of network including an LAN or a WAN, or may be connected to an external computer (through the Internet provided by the Internet Service Provider). In some embodiments, an electronic circuit, such as a programmable logic circuit, a Field Programmable Gate Array (FPGA) or a Programmable Logic Array (PLA), is customized by means of the state information of the computer-readable program instructions. The electronic circuit may perform the computer-readable program instructions to implement various aspects of the disclosure.

Various aspects of the disclosure are described here with reference to flow diagrams and/or block diagrams of the methods, devices (systems) and computer program products according to the embodiments of the disclosure. It should be understood that each of blocks in flow diagrams and/or block diagrams and a combination of blocks in flow diagrams and/or block diagrams may be implemented by the computer-readable program instructions.

These computer-readable program instructions may be provided to a processor of a general-purpose computer, a special-purpose computer or other programmable data processing devices to produce a machine, so that when these instructions are performed by the processor of the computer or other programmable data processing devices, a device for implementing the functions/actions specified in one or more blocks in flow diagrams and/or block diagrams is produced. These computer-readable program instructions may also be stored in the computer-readable storage medium, and these instructions enable the computer, the programmable data processing devices and/or other devices to work in a specific manner. Thus, the computer-readable medium in which instructions are stored includes a manufactured product, including instructions for implementing various aspects of the functions/actions specified in one or more blocks in flow diagrams and/or block diagrams.

The computer-readable program instructions may also be loaded onto the computer, other programmable data processing devices or other devices, so that a series of operating steps are performed on the computer, other programmable data processing devices or other devices to form a computer-implemented process. Therefore, the instructions performed on the computer, other programmable data processing devices or other devices implement the functions/actions specified in one or more blocks in flow diagrams and/or block diagrams.

The flow diagrams and block diagrams in the drawings show the possible architectures, functions and operations of the systems, methods and computer program products according to a plurality of embodiments of the disclosure. In this regard, each of blocks in flow diagrams or block diagrams may represent a module, a program segment, or a part of instructions. The module, the program segment or a part of instructions may include one or more executable instructions for implementing the specified logic functions. In some alternative implementations, the functions marked in the blocks may also occur in an order different from that marked in the drawings. For example, two consecutive blocks actually may be performed substantially in parallel, and sometimes may also be performed in a reverse order, which depends on the involved functions. It should also be noted that each of blocks in block diagrams and/or flow diagrams and a combination of blocks in block diagrams and/or flow diagrams may be implemented with a special hardware-based system for performing specified functions or actions, or may be implemented by a combination of special hardware and computer instructions.

The embodiments of the disclosure have been described above. The above description is exemplary but not exhaustive, and is not limited to the disclosed embodiments. Many modifications and changes will be apparent to those skilled in the art without departing from the scope and spirit of the illustrated embodiments. The selection of terms used herein is intended to best explain the principles and practical applications of the embodiments, or improve the technologies in the market, or enable other common technicians in the art to understand the embodiments disclosed herein.

The invention claimed is:

1. A method for pose and position detection, comprising:
determining first position information of at least one first feature part of a target object within a target image, wherein the target image is taken by a camera device;
determining three-dimensional position information of second feature parts of the target object based on the first position information and device parameters of the camera device, wherein the second feature parts at least comprise the at least one first feature part; and
determining spatial position and pose of the target object based on the first position information of the at least one first feature part comprised in the second feature parts and the three-dimensional position information of the second feature parts.

2. The method of claim 1, wherein determining the first position information of the at least one first feature part of the target object within the target image comprises:

acquiring information of a first feature part to be identified;

identifying the at least one first feature part in the target object based on the information of the first feature part; and determining the first position information of the at least one first feature part based on an established two-dimensional coordinate system.

3. The method of claim 1, wherein determining the three-dimensional position information of the second feature parts of the target object based on the first position information and the device parameters of the camera device comprises:

performing normalization processing on the first position information based on the device parameters of the camera device to obtain second position information; and determining the three-dimensional position information of the second feature parts by using the second position information.

4. The method of claim 3, wherein performing normalization processing on the first position information based on the device parameters of the camera device to obtain the second position information comprises:

performing first normalization processing on the first position information by using the device parameters to obtain third position information of the at least one first feature part;

determining a mean and a variance of the third position information of the at least one first feature part; and performing second normalization processing on the third position information based on the mean and the variance to obtain the second position information.

5. The method of claim 4, wherein performing first normalization processing on the first position information by using the device parameters to obtain the third position information of the at least one first feature part comprises:

performing distortion removing processing on the first position information by using the device parameters; and performing first normalization processing on the first position information obtained by the distortion removing processing to obtain the third position information of the at least one first feature part.

6. The method of claim 1, wherein determining the three-dimensional position information of the second feature parts of the target object based on the first position information and the device parameters of the camera device comprises:

performing normalization processing on the first position information based on the device parameters of the camera device to obtain second position information;

determining fourth position information, which is in a three-dimensional form, of the second feature parts by using the second position information; and performing inverse normalization processing on the fourth position information to obtain the three-dimensional position information of the second feature parts.

7. The method of claim 1, wherein determining the spatial position and pose of the target object based on the first position information of the at least one first feature part comprised in the second feature parts and the three-dimensional position information of the second feature parts comprises:

determining correction parameters based on the first position information of a first feature part comprised in the second feature parts and corresponding three-dimensional position information of the comprised first feature part in the second feature parts;

correcting the three-dimensional position information based on the correction parameters; and determining the spatial position and pose of the target object based on the corrected three-dimensional position information.

8. The method of claim 7, wherein determining the correction parameters based on the first position information of the first feature part comprised in the second feature parts and the corresponding three-dimensional position information of the comprised first feature part in the second feature parts comprises:

converting the corresponding three-dimensional position information of the comprised first feature part in the second feature parts into fifth position information in a two-dimensional form by using a rotation matrix and a translation matrix;

performing feedback-based adjustation on the rotation matrix and the translation matrix based on a difference between the fifth position information and second position information until the difference meets a preset requirement, wherein the second position information is obtained based on a normalization processing of the first position information; and determining the correction parameters based on the rotation matrix and the translation matrix when the difference meets the preset requirement.

9. The method of claim 1, further comprising:

acquiring the target image; and identifying the target object within the target image.

10. The method of claim 1, wherein the at least one first feature part comprises at least one of a head, a neck, shoulders, elbows, wrists, hips, knees or ankles.

11. An electronic device, comprising:

a processor, and a memory configured to store executable instructions of the processor, wherein the processor is configured to: perform a method for pose and position detection, comprising:

determining first position information of at least one first feature part of a target object within a target image, wherein the target image is taken by a camera device;

determining three-dimensional position information of second feature parts of the target object based on the first position information and device parameters of the camera device, wherein the second feature parts at least comprise the at least one first feature part; and determining spatial position and pose of the target object based on the first position information of the at least one first feature part comprised in the second feature parts and the three-dimensional position information of the second feature parts.

12. The electronic device of claim 11, wherein determining the first position information of the at least one first feature part of the target object within the target image comprises:

acquiring information of a first feature part to be identified;

identifying the at least one first feature part in the target object based on the information of the first feature part; and determining the first position information of the at least one first feature part based on an established two-dimensional coordinate system.

13. The electronic device of claim 11, wherein determining the three-dimensional position information of the second feature parts of the target object based on the first position information and the device parameters of the camera device comprises:
    performing normalization processing on the first position information based on the device parameters of the camera device to obtain second position information; and
    determining the three-dimensional position information of the second feature parts by using the second position information.

14. The electronic device of claim 13, wherein performing normalization processing on the first position information based on the device parameters of the camera device to obtain the second position information comprises:
    performing first normalization processing on the first position information by using the device parameters to obtain third position information of the at least one first feature part;
    determining a mean and a variance of the third position information of the at least one first feature part; and
    performing second normalization processing on the third position information based on the mean and the variance to obtain the second position information.

15. The electronic device of claim 14, wherein performing first normalization processing on the first position information by using the device parameters to obtain the third position information of the at least one first feature part comprises:
    performing distortion removing processing on the first position information by using the device parameters; and
    performing first normalization processing on the first position information obtained by the distortion removing processing to obtain the third position information of the at least one first feature part.

16. The electronic device of claim 11, wherein determining the three-dimensional position information of the second feature parts of the target object based on the first position information and the device parameters of the camera device comprises:
    performing normalization processing on the first position information based on the device parameters of the camera device to obtain second position information;
    determining fourth position information, which is in a three-dimensional form, of the second feature parts by using the second position information; and
    performing inverse normalization processing on the fourth position information to obtain the three-dimensional position information of the second feature parts.

17. The electronic device of claim 11, wherein determining the spatial position and pose of the target object based on the first position information of the at least one first feature part comprised in the second feature parts and the three-dimensional position information of the second feature parts comprises:
    determining correction parameters based on the first position information of a first feature part comprised in the second feature parts and corresponding three-dimensional position information of the comprised first feature part in the second feature parts;
    correcting the three-dimensional position information based on the correction parameters; and
    determining the spatial position and pose of the target object based on the corrected three-dimensional position information.

18. The electronic device of claim 17, wherein determining the correction parameters based on the first position information of the first feature part comprised in the second feature parts and the corresponding three-dimensional position information of the comprised first feature part in the second feature parts comprises:
    converting the corresponding three-dimensional position information of the comprised first feature part in the second feature parts into fifth position information in a two-dimensional form by using a rotation matrix and a translation matrix;
    performing feedback-based adjustment on the rotation matrix and the translation matrix based on a difference between the fifth position information and second position information until the difference meets a preset requirement, wherein the second position information is obtained based on a normalization processing of the first position information; and
    determining the correction parameters based on the rotation matrix and the translation matrix when the difference meets the preset requirement.

19. The electronic device of claim 11, the method further comprises:
    acquiring the target image; and
    identifying the target object within the target image.

20. A non-transitory computer-readable storage medium having stored thereon computer program instructions that when performed by a processor, implement a method for pose and position detection, the method comprising:
    determining first position information of at least one first feature part of a target object within a target image, wherein the target image is taken by a camera device;
    determining three-dimensional position information of second feature parts of the target object based on the first position information and device parameters of the camera device, wherein the second feature parts at least comprise the at least one first feature part; and
    determining spatial position and pose of the target object based on the first position information of the at least one first feature part comprised in the second feature parts and the three-dimensional position information of the second feature parts.

* * * * *